United States Patent Office 3,749,687
Patented July 31, 1973

---

3,749,687
FILL-IN COMPOSITIONS CONTAINING AN ORGANIC RESINOUS FILM-FORMING MATERIAL, AN ORGANIC SOLVENT, AND A WAXY MATERIAL
Lester Aronberg, Chicago, and Donald B. Lytton, Lincolnwood, Ill., assignors to Lake Chemical Company, Chicago, Ill.
No Drawing. Filed Nov. 23, 1970, Ser. No. 92,129
Int. Cl. C08f 45/52
U.S. Cl. 260—23 TN                                6 Claims

---

ABSTRACT OF THE DISCLOSURE

Compositions, preferably in stick or pencil form, having particular utility for filling scored, nicked, scratched, stamped, carved, engraved, or the like, surfaces, comprising an organic resinous film-forming material, an organic solvent in which the resinous film-forming material is soluble, and a waxy material which is substantially insoluble in the organic solvent at least at ordinary or room temperatures.

---

The present invention relates to compositions which have special utility as fill-in materials for use on a wide variety of surfaces.

Various fill-in materials heretofore have been developed for use, for example, in repairing nicks or scratches or grooves in surfaces. Such materials, however, have a number of shortcomings, among which is that various of them are limited to use on a particular type of surface, i.e., wood. In addition, a substantial proportion of such prior fill-in materials are liquid or paste-like compositions which are messy to handle, are wasteful in use, and require relatively long periods of time to dry or cure. Those which have heretofore been prepared in stick or pencil form also have been characterized in that they remain in an undry state, or require long drying or curing times after application.

In accordance with the present invention, compositions are provided which can be used as fill-in materials on substantially any surface including those fabricated of metal, plastics, ceramics, wood, glass, rubber, leather and fiberboard. The compositions are solid at ordinary or room temperatures, and can be readily fabricated and maintained in a self-sustaining shape such as a stick or pencil, thereby greatly facilitating the use thereof. Under normal conditions, the compositions, in the form of sticks or pencils, have a dry, thin surface film or skin so that handling of the same is simple and convenient with no attendant messiness. Upon application, the compositions dry quickly, usually by virtue of the evaporation of the solvent but, commonly, also, depending upon the composition, by oxidation. However, the compositions of this invention are sharply distinguished from those which depend essentially on oxidation for drying because such require hours to become dry. The compositions of this invention dry in a matter of a few minutes or less. Waste is prevented since substantially the exact amount of a composition of this invention required to fill-in an area of a surface may be applied by simply rubbing, in one pass, the composition over the area to be filled in. The compositions may be made in any color desired, and may be formulated to make then resistant to attack by organic solvents, detergents, mild acids, alkalis, and the like. The compositions dry to a flexible or rubbery hardness, and are capable of expanding and contracting with the surface on which they are applied, a property which contributes to their permanency after application to a surface.

Briefly, the compositions of the present invention comprise, as essential ingredients, an organic resinous, film-forming material, an organic solvent in which the organic resinous film-forming material is soluble, and a waxy material which is substantially insoluble in the organic solvent at least at ordinary or room temperatures. Small amounts of various supplemental ingredients such as pigments, fillers, drying accelerators, plasticizers, and the like, may be incorporated into the composition to vary the properties thereof as desired.

A wide variety of organic resinous film-forming materials, including both synthetic and natural organic resinous film-forming materials, can be used in formulating the compositions of this invention. Exemplary of synthetic organic resinous film-forming materials which are useful are acetal resins, alkyd resins, allyl resins, amino resins, cellulose esters and ethers, coumaroneindene resins, sytrene-butadiene resins, epoxy resins, polyamides, phenolic resins, vinyl resins, polycarbonates, urea resins, polyterpene resins, acrylic resins, polyurethanes, and the like, and copolymers of the monomeric constituents thereof. Compatible mixtures of such resins and copolymers can also be used. Among the natural resins which have utility in the practice of this invention are rosin, various modified rosin esters and rosin polymers, copal, and the like. Mixtures of synthetic and natural resins can, of course, be used. The resin, or resins, may be compounded with stabilizers, plasticizers, lubricants, or modified chemically to impart the required properties to them. Excellent results are attainable with a polymerized phenolic resin sold under the trade designation Resin 2432 (Union Carbide), and an oil-modified polyurethane resin available commercially under the trade designation XP1434 (Spencer-Kellogg).

The waxy materials which are employed in the present invention can be selected from many amoung which can be mentioned, by way of illustration, paraffin waxes, vegetable and animal waxes such as carnauba wax, beeswax, candelilla, and synthetic waxes; higher molecular weight carboxylic and fatty acids having a waxy character as, for example, stearic acid, melissic acid and the like; meltable soaps such as triethanolamine stearate; and hydrogenated animal and vegetable oils such as hydrogenated cottonseed oil, hydrogenated lard oil, hydrogenated corn oil, and the like, such oils being hydrogenated to an extent sufficient to bring the melting point up to at least 140° F. Excellent results can be obtained with an oxidized microcrystalline wax sold under the trademark "Petronauba Wax C–8500" (Bareco). Especially desirable, however, are compositions which include carnauba or candelilla wax as a substantial constituent.

The waxy materials, of course, should be compatible with, and be capable of forming a homogeneous mixture with, the organic resinous film-forming materials utilized. The waxy materials are further characterized in that they are insoluble, or difficultly soluble, at least at ordinary or room temperatures, in the organic solvents used in formulating the compositions. The waxy material, on the other hand, should be soluble, or substantially so, in the solvent at elevated temperatures. This enables intimate mixing of the waxy material with the organic resinous film-forming material and, upon cooling, imparts a gel or paste-like consistency to the compositions which acts to absorb the solvent thereby providing a substantially homogeneous, pliable mixture which can be easily molded, extruded, pressed, or otherwise shaped into a self-sustaining form such as a pencil or stick.

The organic solvents, from which a proper selection can be made to meet the above mentioned desiderata, most advantageously have boiling points in the range of about 120°

C. to about 300° C., especially desirably from about 175° C. to about 220° C., and evaporation rates of the order of about 10 to about 700 minutes, preferably from about 30 to about 150 minutes, as determined by the Shell Evaporation Test. Exemplary of organic solvents which can be used are aliphatic alcohols such as amyl alcohol, cyclohexanol, tridecyl alcohol, and methyl isobutyl Carbitol; esters exemplified by amyl acetate, hexyl acetate, isobutyl isobutyrate, sec-octyl acetate, and Cellosolve acetate; ethers such as Cellosolve, ethyl Cellosolve, butyl Cellosolve, and benzyl ether; ketones, specific examples of which are diisobutyl ketone, ethyl butyl ketone, and cyclohexanone; aromatic hydrocarbon solvents exemplified by toluene, xylenes, tetralin and nitrobenzene; petroleum solvents such as mineral spirits, gasoline, kerosene and naphtha; turpentine; and the like, and compatible mixtures of the foregoing. Excellent results can be attained with commercially available mixtures of aromatic hydrocarbon solvents exemplified by the products sold under the trade designations SC–100 and SC–150 (Esso Standard). Generally speaking, the organic solvent is added as a separate component in the formulation of the compositions. However, in those instances wherein the organic resinous film-forming material used is already incorporated in an organic solvent, no further addition of solvent may be required. A specific illustration of such a resin-solvent product is the one sold under the trade designation F–77 60MS (Spencer-Kellogg). This product comprises 60% oil-modified polyurethane in mineral spirits.

As indicated, the compositions of this invention may be colored, as desired, in accordance with either the nature of the surface to which they are applied, or to satisfy the particular needs of the user. The coloring material or pigments employed may be selected from a large group, including both inorganic and organic pigments. Typical examples of inorganic pigments which can be used are black iron oxide, red iron oxide, copper bronze, chromium oxides, titanium dioxide, cobalt oxide, and cadmium sulfide. Exemplary of organic pigments are phthalocyanine green, hansa yellow, alizarine maroon, benzidine yellow, pyrazolone, indanthrone, and the like.

As stated earlier, the compositions when molded, extruded, pressed or otherwise formed into a self-sustaining shape such as sticks or pencils, have a dry, thin surface film or skin. In those instances where a drying oil is present, the film or skin results, in the main, from oxidation of the surface by contact thereof with the air and evaporation of a portion of the solvent. In those instances where a drying oil is not present, the film or skin results from evaporation of a portion of the solvent from the exposed area of the stick or pencil. This film forms a barricade or skin or layer impervious or substantially impervious to the passage of air or other gases therethrough and, as stated, renders the exterior surface dry. To promote the formation of the skin or film, small amounts of various air-oxidizable, film-forming materials may be employed. Illustrative examples of such materials are the so-called drying oil and semi-drying oil fatty acids, which may be derived from linseed oil, dehydrated castor oil, soya bean oil, perilla oil, oiticica oil, and tung oil; Neofat #19 acids which comprise essentially unsaturated fatty acids containing 20 to 22 carbon atoms with three or four double bonds and minor proportions of other unsaturated fatty acids. Derivatives of such carboxylic acids are the drying oils and semi-drying oils (hereafter denoted generically as drying oils), such as linseed oil, dehydrated castor oil, tung oil, perilla oil, oiticica oil, certain fish oils, and the like. Such oils are, of course, triglycerides or, in other words, polyhydric alcohol esters, completely esterified, of the drying oil and semi-drying oil fatty acids previously enumerated. In place of the triglycerides, partial esters with other polyhydric alcohols may be utilized as, for example, the monoglycerides and diglycerides of the drying oil and semidrying oil fatty acids as well as the partial and complete esters of such acids with glycols, polyglycols, polyglycerols, sugar alcohols such as sorbitol, mannitol, sorbitan, mannitan, and the like. Other derivatives of the aforesaid unsaturated fatty acids are the simple alcohol esters thereof as, for example, ethyl linoleate, butyl linoleate, and the like. All of such acids or derivatives thereof are characterized by being oxidized on contact with air to form a dry film or skin.

Other supplemental ingredients which may be used to advantage are drying accelerators and oxidation retarding agents and, as mentioned above, plasticizers. The drying accelerators comprise, for example, cobalt acetate, manganese acetate, cobalt hydrate, cobalt naphthenate, or other cobalt or manganese salts. The drying accelerator serves to enhance the re-formation of the film or skin on the composition after the film or skin has been removed at the end of the stick or pencil prior to applying the composition to a surface. In order to enhance the shelf life of the compositions, it is sometimes advantageous to add oxidation retarding agents to the compositions. A suitable agent for this purpose is tallow, ordinary beef tallow being preferred. Illustrative plasticizers are tricresyl phosphate and polypropylene glycols as, for instance, polypropylene glycols having a molecular weight of about 2,000.

In addition, various fillers which serve as oil absorbent and body-forming substances can be incorporated in the compositions. The fillers are generally of inorganic character and may be selected from a large group, illustrative examples of which are talc, barium sulfate, calcium carbonate, diatomaceous earth, carbon black, bentonite, and the like. It is preferred to employ fillers which have pigment properties such as titanium dioxide or carbon black. If the filler does not have the desired color, pigments are added as indicated above.

While the proportions of the organic resinous film-forming material, the waxy material and the organic solvents are variable, in general, the proportions, by weight, will fall into the range of about 3% to about 80%, particularly about 20% to about 50%, by weight, of the organic resinous film-forming material; from about 10% to about 95%, particularly from about 40% to about 80%, by weight, of the waxy material; and from about 2% to about 25%, particularly from about 8% to about 20%, by weight, of the organic solvent, adjusted to produce a moldable, or extrudable, form-sustaining solid composition. It is particularly preferred to use as little organic solvent as is reasonably possible. The organic solvent appears to be taken up by and absorbed into the wax or waxy component. The supplemental ingredients will only comprise a small portion, for example, of the order of about 0.1% to 1% to about 10%, by weight, usually about 0.5% to about 5%, of the compositions in those instances where used.

The following examples are illustrative of compositions falling within the scope of the present invention. It will be understood that various changes may be made therein, within the scope of the guiding teachings and principles disclosed herein, as, for example, by the use of different organic resinous film-forming materials, different organic solvents, different waxes, different pigments, etc. and varying proportions of supplemental ingredients. All parts are listed by weight.

EXAMPLE 1

Oxidized microcrystalline wax (Petronauba Wax C–8500) _____ 10
Phenolic resin (Resin 2432) _____ 10
Solvent (SC–100) _____ 5
Pigment _____ 2

EXAMPLE 2

Oxidized microcrystalline wax (Petronauba Wax C–8500) _____ 5
Phenolic resin (Resin 2432) _____ 15
Solvent (SC–100) _____ 4
Pigment _____ 2

EXAMPLE 3

| | |
|---|---|
| Acrawax | 5 |
| Candelilla wax | 10 |
| Phenolic resin (Resin 2432) | 5 |
| Solvent (SC-100) | 4 |

EXAMPLE 4

| | |
|---|---|
| Candelilla wax | 10 |
| Acrylic resin (B-67 Rohm & Haas) | 3 |
| Polyurethane resin-oil-modified (XP-1434) | 3 |
| Polyurethane resin (F-77 60MS) (60% oil-modified polyurethane in mineral spirits) | 10 |

EXAMPLE 5

| | |
|---|---|
| Candelilla wax | 14 |
| Polyurethane resin-oil-modified (XP-1434) | 4 |
| Acrylic resin (B-67) | 2 |
| Solvent (SC-150) | 2 |
| Titanium dioxide | 0.5 |

EXAMPLE 6

| | |
|---|---|
| Candelilla wax | 15 |
| Beeswax | 5 |
| Phenolic resin | 10 |
| Titanium dioxide | 10 |
| Solvent (SC-150) | 3 |

EXAMPLE 7

| | |
|---|---|
| Carnauba | 14 |
| Polytung (Degan Oil Co.) | 3 |
| Polypropylene glycol 2025 (Union Carbide) | 3 |
| Solvent (SC-150) | 2 |
| Acyrlic resin (B-67) | 1 |

EXAMPLE 8

| | |
|---|---|
| Carnauba wax | 10 |
| Beeswax | 10 |
| Phenol-formaldehyde resin | 5 |
| Solvent | 2 |
| Titanium dioxide | 8 |

EXAMPLE 9

| | |
|---|---|
| Carnauba wax | 14 |
| Linseed oil | 3 |
| Tricresyl phosphate | 3 |
| Solvent (SC-150) | 1 |
| Acrylic resin (B-67) | 1 |

EXAMPLE 10

| | |
|---|---|
| Candelilla wax | 6 |
| Polymerized mixture of 1 part tung oil with 2 parts phenolic resin | 3 |
| Solvent (SC-100) | 2 |
| Pigment | 1 |

EXAMPLE 11

| | |
|---|---|
| Candelilla wax | 10 |
| DA resin polymer of equal parts of phenolic acid (Bakelite 2432), tung oil and epoxy resin (Shell Epoxy 828) heated at 230-240° C. for 1 to 1½ hours | 10 |
| Solvent (SC-150) | 2 |

EXAMPLE 12

| | |
|---|---|
| Candelilla wax | 10 |
| Oil-modified polyurethane resin (F-77 60MS) | 10 |
| Solvent (SC-100) | 0.5 |
| Aluminum powder | 2 |
| Acrylic resin (B-67) | 2 |

EXAMPLE 13

| | |
|---|---|
| Carnauba wax | 15 |
| Acrylic resin (B-67) | 3 |
| Linseed oil | 3 |
| Carbon black | 1 |
| Amyl alcohol | 2 |

EXAMPLE 14

| | |
|---|---|
| Candelilla wax | 14 |
| Phenolic resin (Resin 2432) | 4 |
| Titanium dioxide | 1 |
| Cellosolve | 1 |
| Solvent (SC-150) | 1.5 |

In use, the protective film is peeled off from the end of the stick or pencil of the fill-in composition. The stick or pencil is rubbed heavily into the nick or scratch on the surface. The composition is then pressed into place most desirably with a spatula or the like by stroking firmly with the flat edge of the spatula, stroking in one direction and wiping the spatula clean after each stroke. Excess composition is then shaved or removed with the edge of the spatula. The repair may, if desired, be polished by wiping with a cloth or stroking lightly with a teflonized edge of a spatula. After application, a skin again forms on the end surface of the stick or pencil which serves as a protective coating, which is again removed by peeling or the like when the stick or pencil is again to be used.

What is claimed is:

1. A composition having particular utility for filling scored, nicked, scratched, or the like, surfaces and restoring the uniformity of said surfaces comprising a substantially homogeneous solid at room temperature and of a consistency such that it is moldable into a form-sustaining shape suitable as a self-supplying implement which retains its form and shape when held in the hand, said composition comprising, as essential ingredients,
   (a) about 3% to about 80%, by weight, of an organic resinous film-forming material,
   (b) about 2% to about 25%, by weight, of an organic solvent in which said resinous film-forming material is soluble at room temperatures, said solvent having a boiling point in the range of about 120° C. to about 300° C., and
   (c) about 10% to about 95%, by weight, of a waxy material which is substantially insoluble in said organic solvent at room temperatures,
the surface of the composition in its form-sustaining shape being dry to the touch, said composition being adapted in said shape to be applied as by rubbing to a score, nick, scratch, or the like, in a surface, and being capable upon exposure to the atmosphere at room temperatures of forming in the score, nick, scratch, or the like, a permanent, hard filled-in area which acts to restore the uniformity of the surface.

2. A composition according to claim 1 wherein the solvent is an aromatic hydrocarbon solvent.

3. A composition as claimed in claim 1 wherein the composition is in the form of a stick or pencil of a convenient size and shape for manual manipulation.

4. A composition as claimed in claim 1 wherein the waxy material is candelilla or carnauba wax.

5. A composition as claimed in claim 1 comprising about 14 parts by weight of candelilla wax, about 4 parts by weight of an oil modified polyurethane resin, about 2 parts by weight of an acrylic resin, about 2 parts by weight of an aromatic hydrocarbon solvent, and about 1 part by weight of a pigment.

6. A composition as claimed in claim 1 comprising, by weight, about 14 parts carnauba wax, about 3 parts linseed oil, about 1 part film-forming acrylic resin, about 3 parts of a plasticizer for said resin, and about 1 part of solvent.

(References on following page)

References Cited

UNITED STATES PATENTS

| | | | |
|---|---|---|---|
| 3,098,053 | 7/1963 | Hallonquist | 260—31.2 |
| 3,186,856 | 6/1965 | Leutzinger | 106—245 |
| 3,267,052 | 8/1966 | Brennan | 260—5 |
| 3,574,155 | 4/1971 | Parker | 260—23 |
| 3,492,258 | 1/1970 | Kremer | 260—23 X |
| 3,539,376 | 11/1970 | Otani et al. | 260—28.5 X |

DONALD E. CZAJA, Primary Examiner
E. C. RZUCIDLO, Assistant Examiner

U.S. Cl. X.R.

106—230; 117—2 R; 260—23 AR, 28.5 R, 33.6 UB